United States Patent
Izumi et al.

(10) Patent No.: US 10,403,942 B2
(45) Date of Patent: Sep. 3, 2019

(54) COOLING SYSTEM FOR VEHICLE-MOUNTED SECONDARY BATTERY

(71) Applicant: TOYOTA JIDOSHA KABUSHIKI KAISHA, Toyota-shi, Aichi-ken (JP)

(72) Inventors: Junta Izumi, Nagoya (JP); Kiyohito Machida, Nissin (JP); Masakazu Habu, Toyota (JP); Kiyoe Ochiai, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 16 days.

(21) Appl. No.: 15/092,207

(22) Filed: Apr. 6, 2016

(65) Prior Publication Data

US 2016/0301114 A1    Oct. 13, 2016

(30) Foreign Application Priority Data

Apr. 10, 2015  (JP) ................... 2015-080604

(51) Int. Cl.
  *B60L 11/18*    (2006.01)
  *H01M 10/613*   (2014.01)
  (Continued)

(52) U.S. Cl.
  CPC ...... *H01M 10/613* (2015.04); *B60H 1/00278* (2013.01); *B60H 1/00335* (2013.01); *B60H 1/00392* (2013.01); *B60L 58/26* (2019.02); *H01M 10/443* (2013.01); *H01M 10/486* (2013.01); *H01M 10/625* (2015.04);
  (Continued)

(58) Field of Classification Search
  CPC ............ B60L 11/1874; B60H 1/00278; B60H 2001/003; B60H 1/00335; B60H 1/00392
  See application file for complete search history.

(56) References Cited

U.S. PATENT DOCUMENTS 5,937,664 A * 8/1999 Matsuno ............ B60H 1/00278
                                                    62/186
2007/0178346 A1 * 8/2007 Kiya ................... H01M 10/486
                                                    429/432

(Continued)

FOREIGN PATENT DOCUMENTS

JP    2010-158964 A    7/2010
JP    WO2014/058021   * 4/2014 ............... B60I 11/18

*Primary Examiner* — Edward F Landrum
*Assistant Examiner* — Nael N Babaa
(74) *Attorney, Agent, or Firm* — Sughrue Mion, PLLC

(57) ABSTRACT

A cooling system for cooling a main battery 10 includes a cooling fan 40 and a temperature sensor 61 configured to detect a battery temperature TB. The cooling system performs constant control in which the cooling fan 40 is driven at a constant command value when the battery temperature TB reaches or exceeds a first temperature T0 after startup of the electrically powered vehicle. Additionally, the cooling system detects whether or not a malfunction occurs in the cooling fan 40, based on an actual rpm of the cooling fan 40 obtained during the constant control. The cooling system performs the constant control in a situation in which charging of the main battery 10 is continued for a predetermined period of time or longer after the startup of the vehicle, regardless of whether the battery temperature TB is below the first temperature T0.

5 Claims, 12 Drawing Sheets

(51) Int. Cl.
*B60H 1/00* (2006.01)
*H01M 10/44* (2006.01)
*H01M 10/48* (2006.01)
*H01M 10/625* (2014.01)
*H01M 10/6563* (2014.01)
*B60L 58/26* (2019.01)

(52) U.S. Cl.
CPC ... H01M 10/6563 (2015.04); *B60H 2001/003* (2013.01); *H01M 2220/20* (2013.01)

(56) References Cited

U.S. PATENT DOCUMENTS

| | | | |
|---|---|---|---|
| 2010/0089669 A1* | 4/2010 | Taguchi | B60H 1/00257 180/65.1 |
| 2013/0030643 A1* | 1/2013 | Nishizawa | F01P 5/14 701/32.8 |
| 2014/0114514 A1* | 4/2014 | Crombez | B60W 10/06 701/22 |

* cited by examiner

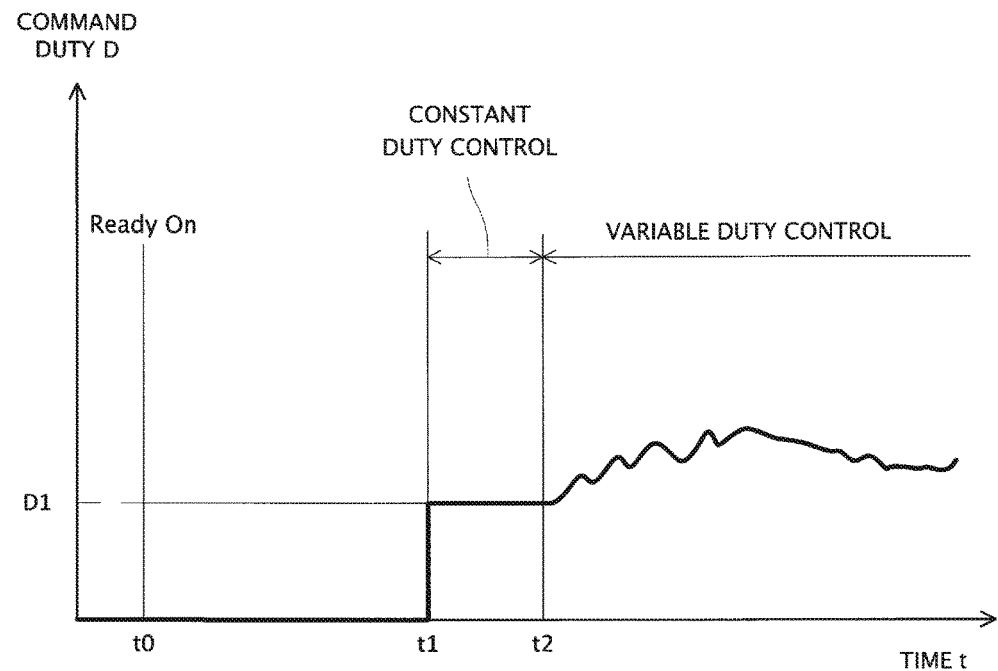
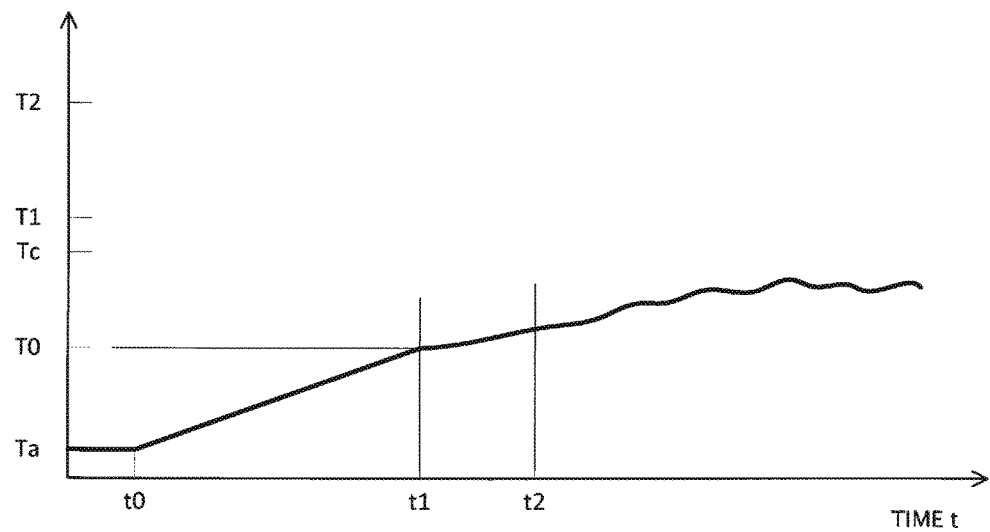
FIG. 7

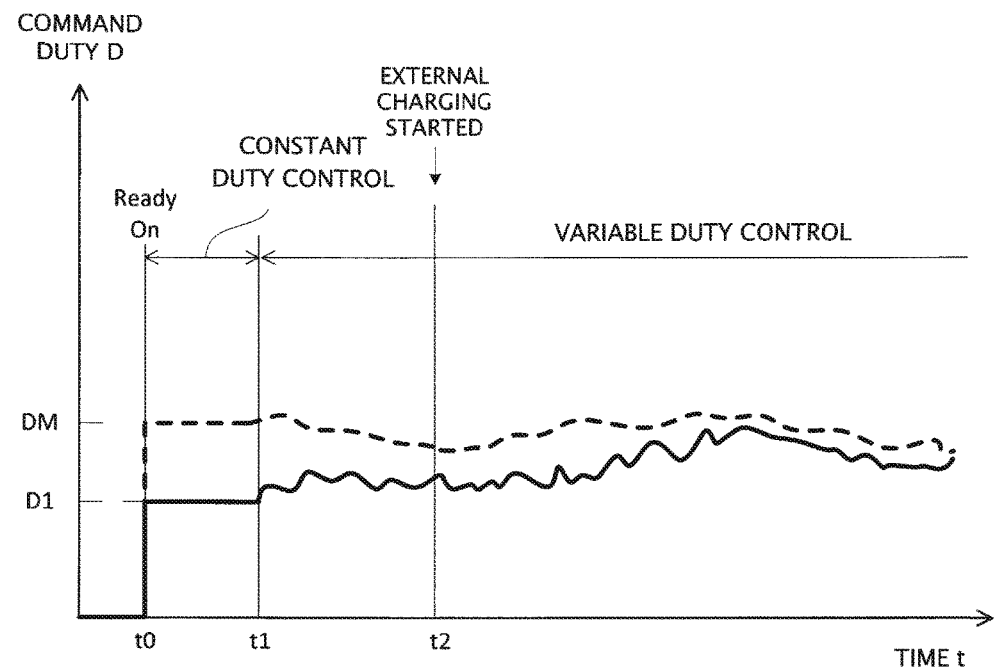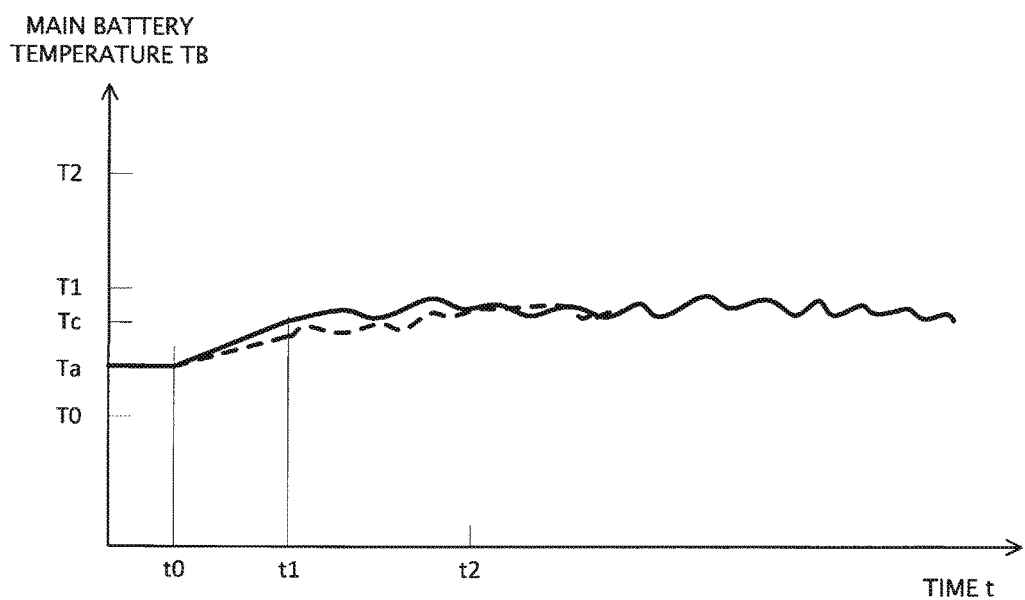
FIG. 9

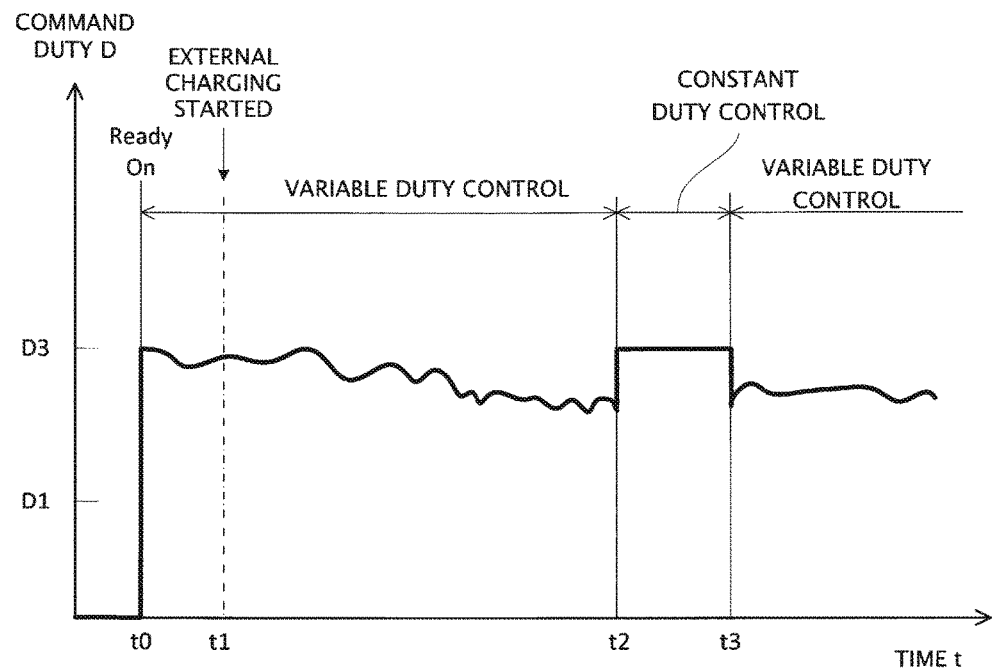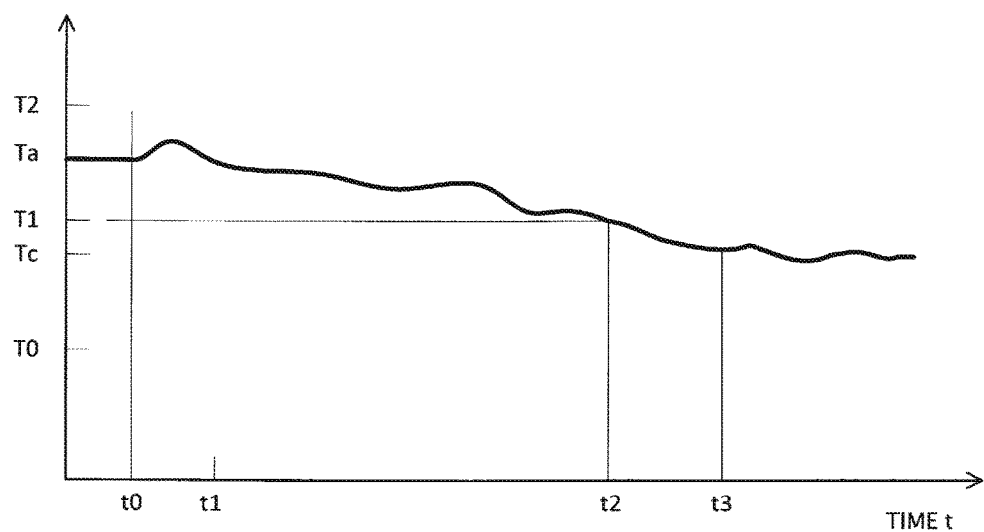
FIG. 10

COOLING SYSTEM FOR VEHICLE-MOUNTED SECONDARY BATTERY

PRIORITY INFORMATION

This application claims priority to Japanese Patent Application No. 2015-080604 filed on Apr. 10, 2015, which is incorporated herein by reference in its entirety.

FIELD

The present invention relates to a cooling system for cooling a vehicle-driving secondary battery.

BACKGROUND

Electrically powered vehicles such as hybrid electric vehicles and electric vehicles incorporate a secondary battery (rechargeable battery) for storing electric energy for use in driving the vehicle. As the charging and discharging of the secondary battery cause a temperature increase due to the internal resistance of the secondary battery, the secondary battery should be cooled down. To this end, there has been proposed an approach of providing a cooling fan near the secondary battery to forcedly air-cool the secondary battery using the cooling fan.

For example, JP 2010-158964 A discloses a cooling device for a vehicle's electrical components, wherein a cooling fan is provided near a secondary battery. In JP 2010-158964 A, a duct through which cooling air generated by driving the cooling fan flows is branched in two directions at a point of the duct, and the path of the cooling air is switched depending on the temperature of a charger mounted in a vehicle. The cooling device changes the command duty for the cooling fan in accordance with the temperature of a high-voltage secondary battery or a vehicle-mounted charger that is to be cooled. The cooling device detects whether or not a failure occurs in the cooling fan, and in the event of a failure, outputs a signal to a diagnosis system and changes the control of electrical components in accordance with the type of the failure.

Whether a malfunction occurs in the cooling fan is often determined based on a detected parameter such as an actual rpm (revolutions per minute) value of the cooling fan. Such determination should be performed under a steady state in which the cooling fan is driven stably. The reason is that significant fluctuations in driving conditions of the cooling fan (for example, the rpm of the fan) result in inclusion of an error in a detected parameter due to, for example, delays in control, and therefore impair the accuracy in determining whether or not a failure occurs.

In JP 2010-158964 A, as the command duty is changed in accordance with the temperature of a high-voltage secondary battery or a charger, it is unlikely for the cooling fan to be in a steady state, making it difficult to accurately determine whether or not a malfunction occurs in the cooling fan. To address this situation, the cooling fan may be driven at a constant duty (constant rpm) without changing the command duty (command rpm) for the cooling fan. In this case, because the driving conditions of the cooling fan are stable, whether or not a malfunction occurs can be determined accurately. However, if the cooling fan is continuously driven at a constant duty (constant rpm) regardless of the state of the secondary battery or vehicle's driving conditions, there are problems in that an insufficient rpm leads to degradation of the secondary battery, as it is not cooled sufficiently, and conversely, an unnecessarily high rpm causes excessive noise or power consumption.

In consideration of the above, an object of the present invention is to adequately cool the vehicle-driving secondary battery while providing a sufficient opportunity for detecting whether or not a malfunction occurs in the cooling fan.

SUMMARY

According to one aspect of the present invention, there is provided a cooling system for cooling a vehicle-driving secondary battery mounted in an electrically powered vehicle. The cooling system includes a cooling fan configured to supply cooling air to the secondary battery, and a temperature sensor configured to detect a battery temperature representing a temperature of the secondary battery. The cooling system is configured to perform constant control in which the cooling fan is driven at a constant command value for a predetermined period of time when the battery temperature reaches or exceeds a predefined first temperature after startup of the electrically powered vehicle. The cooling system is further configured to perform a malfunction detection process for detecting whether or not a malfunction occurs in the cooling fan, based on an actual rpm of the cooling fan obtained during the constant control. The cooling system performs the constant control in a situation in which charging of the secondary battery is continued for a predetermined period of time or longer after the startup of the electrically powered vehicle, regardless of whether or not the battery temperature is below the first temperature. The startup of the electrically powered vehicle represents activation of an electronic control unit (ECU).

In some embodiments, the situation in which the charging is continued for a predetermined period of time or longer includes a situation in which an SOC recovery switch through which a user provides an instruction for increasing an SOC of the secondary battery is turned ON. In other embodiments, the situation in which the charging is continued for a predetermined period of time or longer includes a situation in which the vehicle is charged from an external power supply. In still other embodiments, the situation in which the charging is continued for a predetermined period of time or longer includes a situation in which an SOC of the secondary battery is below a predetermined lower threshold.

In yet other embodiments, the cooling fan is driven under variable control using a command value that varies in accordance with at least the battery temperature when the constant control is not to be performed, and when the secondary battery is to be cooled.

According to one or more aspects of the present invention, because constant control is performed not only when the battery temperature is at or above the first temperature but also when charging of the secondary battery is continued for a predetermined period of time or longer even if the battery temperature is below the first temperature, an opportunity for a malfunction detection process is provided. Therefore, it is possible to adequately cool the vehicle-driving secondary battery while providing a sufficient opportunity for detecting whether or not a malfunction occurs in the cooling fan.

BRIEF DESCRIPTION OF THE DRAWINGS

Preferred embodiments will be described in detail based on the following figures, wherein:

FIG. 7 is a time chart illustrating the command duty for the cooling fan and the battery temperature for a case where the battery temperature is below a first temperature T0 during startup and no charging is performed;

FIG. 9 is a time chart illustrating the command duty for the cooling fan and the battery temperature for a case where the battery temperature is at or above the first temperature T0 and below a second temperature T1 during startup and charging is performed;

FIG. 10 is a time chart illustrating the command duty for the cooling fan and the battery temperature for a case where the battery temperature is at or above the second temperature T1 during startup and charging is performed;

DESCRIPTION OF EMBODIMENTS

System Structure of Electrically Powered Vehicle

Figure 1:
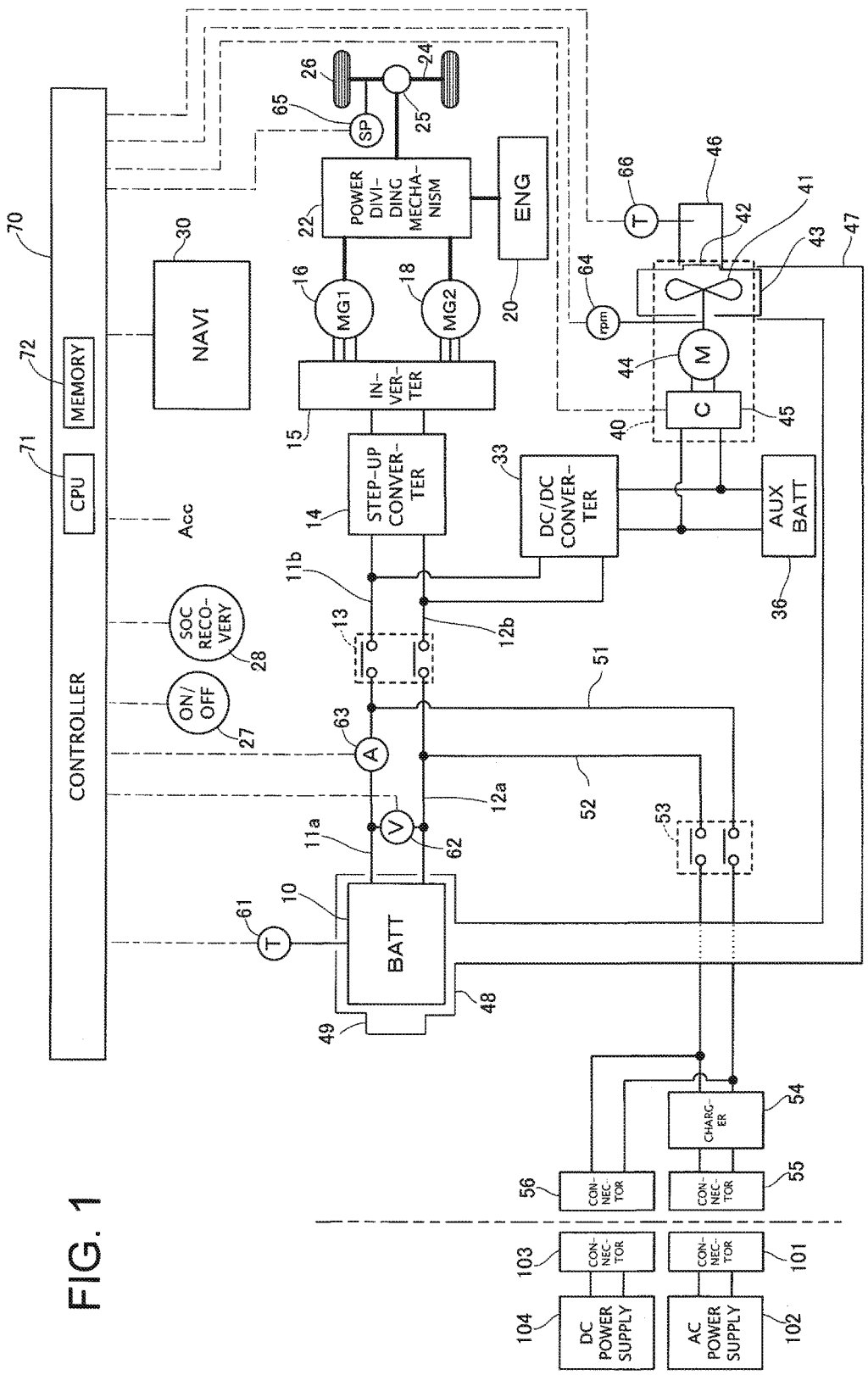
FIG. 1 is a system diagram illustrating a structure of a cooling system for a vehicle-mounted secondary battery according to an embodiment of the present invention.

Embodiments of the present invention will be described below with reference to the accompanying drawings. First, there will be described a system structure of an electrically powered vehicle in which a cooling system for a vehicle-mounted secondary battery according to an embodiment of the present invention is mounted. In FIG. 1, alternate long and short dashed lines represent signal lines. A vehicle-driving main battery 10 is connected to positive and negative input terminals of a system main relay 13 via a positive bus bar 11a and a negative bus bar 12a. The main battery 10 is a chargeable and dischargeable secondary battery such as a nickel-metal hydride battery or a lithium ion battery. A positive output terminal and a negative output terminal of the system main relay 13 are connected to a step-up converter 14 via a positive bus bar 11b and a negative bus bar 12b, respectively. Positive and negative output terminals of the step-up converter 14 are connected to positive and negative input terminals of an inverter 15. Two sets of three output bus bars, U-phase, V-phase, and W-phase bus bars, are connected to the inverter 15, and these output bus bars are connected to U-phase, V-phase, and W-phase input terminals of a first motor generator 16 and a second motor generator 18. Output shafts of the motor generators 16 and 18 are connected to a power dividing mechanism 22 including, for example, a planetary gear train. An output shaft of an engine 20 is also connected to the power dividing mechanism 22. An output shaft of the power dividing mechanism 22 drives wheels 26 via a gear mechanism 25 and an axle shaft 24. A velocity sensor 65 for detecting the velocity of the vehicle based on the rpm is attached to the axle shaft 24.

A positive bus bar 51 and a negative bus bar 52 are respectively branched off from the positive bus bar 11a and the negative bus bar 12a connected to the main battery 10. A charger 54 is connected to the bus bars 51 and 52 via a charging relay 53. The charger 54 converts power supplied from an external AC power supply into charging power that is to be charged to the main battery 10. A connector 55 (or an inlet) is connected to the charger 54. The connector 55 may be connected to a connector 101 (or a charging plug) of an AC power supply 102 (for example, utility power). Connecting the connector 101 to the connector 55 allows the AC power supply 102 to charge power to the main battery 10. Also, a connector 56 is connected to the positive and negative bus bars 51 and 52. A connector 103 of an external DC power supply 104 may be connected to the connector 56. This configuration allows the external DC power supply 104 to charge power to the main battery 10. In the following description, the charging of power supplied from the external power supply 102 or 104 is referred to as "external charging."

A DC/DC converter 33 is also connected to the positive and negative bus bars 11b and 12b, to which are connected the positive output terminal and the negative output terminal, respectively, of the system main relay 13 to which the main battery 10 is connected. An output of the DC/DC converter 33 is connected to an auxiliary battery 36, and the DC/DC converter 33 steps down a voltage of the main battery 10 to an auxiliary voltage, such as 12 V or 24 V, and charges the auxiliary battery 36. A cooling fan 40 is connected to the auxiliary battery 36. The cooling fan 40 includes a fan body 41 in which an impeller is housed, a motor 44 for driving the impeller, and a control unit 45 for controlling the speed of the motor 44. The motor 44 may be any type of motor whose rpm is controllable, and may be a DC motor or an AC motor. In the illustrated embodiment, a brushless DC motor is used as the motor 44. An intake duct 46 for taking in cooling air is connected to an intake port 42 of the fan body 41, and a connecting duct 47 for supplying the cooling air to a casing 48 in which the main battery 10 is housed is connected to a vent port 43 of the fan body 41. An exhaust duct 49 for exhausting air after the air cools the main battery 10 is attached to the casing 48. Although, in the illustrated embodiment, the fan body 41 is connected to the intake duct 46, the fan body 41 may be connected to the exhaust duct 49 to generate a negative pressure in the casing 48 as the cooling fan 40 is driven, so that cooling air is drawn to the main battery 10.

Additionally, for example, an ignition switch 27 and an SOC recovery switch 28 are provided in the cabin of the electrically powered vehicle. The ignition switch 27 receives from a user an instruction for starting or stopping operation of the electrically powered vehicle. The SOC recovery switch 28 receives from the user an instruction for increasing an SOC. When the SOC recovery switch 28 is turned ON, a controller 70 performs SOC recovery control in which, for example, the motor generator 16 is driven in a regenerative manner using power from the engine 20 to increase an SOC (the ratio of the remaining capacity to the fully charged capacity). Also provided in a cabin is a navigation system 30 for, for example, detecting where the electrically powered vehicle is currently located, or providing a route to a destination. The controller 70 estimates an inclination Inc of the current location based on route information provided from the navigation system 30. Based on the route information, the controller 70 also predicts, for example, the amount of regenerative charging during vehicle's downhill driving or the time for which charging through regenerative braking is to be continued.

A temperature sensor 61 for detecting a temperature ("battery temperature TB") is attached to the main battery 10. While only a single temperature sensor 61 may be provided, a plurality of temperature sensors 61 may also be provided at a plurality of positions of the main battery 10. When a plurality of temperature sensors 61 are provided, a statistical value of the plurality of temperature sensors 61, such as an average value, a minimum value, or a maximum value, is used as the battery temperature TB. A voltage sensor 62 for detecting a voltage VB of the main battery 10 is connected between the positive and negative bus bars 11a and 12a connected to the main battery 10. A current sensor 63 for detecting a current IB charged to or discharged from the main battery 10 is attached to the positive bus bar 11a between the main battery 10 and the system main relay 13. An rpm sensor 64 for detecting the number of revolutions of the motor 44 is attached to the cooling fan 40, and a temperature sensor 66 for detecting an intake air temperature is attached to the intake duct 46. The controller 70 calculates an SOC based on, for example, the detected voltage VB, current IB, and/or battery temperature TB. The controller 70 controls the driving of the motor generators 16 and 18 and the engine 20 in an attempt to prevent the SOC from dropping below a predetermined lower threshold or exceeding a predetermined upper threshold. For example, when the SOC drops below the lower threshold, the controller 70 performs SOC recovery control in which, for example, the motor generator 16 is driven in a regenerative manner using power from the engine 20 to increase the SOC.

As illustrated in FIG. 1, the control unit 45 of the cooling fan 40 is connected to the controller 70, and the cooling fan 40 is driven in accordance with a command from the controller 70. The ignition switch 27, the temperature sensors 61 and 66, the voltage sensor 62, the current sensor 63, the rpm sensor 64, and the velocity sensor 65 are also connected to the controller 70, and Ready-ON and Ready-OFF signals from the ignition switch 27 and detection signals from the sensors 61 to 66 are input to the controller 70. Signals representing, for example, an accelerator angle Acc and an amount of depression of a brake pedal are also input to the controller 70. The controller 70 is a computer including therein a CPU 71 for performing arithmetic processing and signal processing and a memory 72 for storing, for example, control data, control maps, and programs. For example, an ON/OFF signal indicating whether the engine 20 is operating or stops, or a signal indicating whether or not the connector 55 or 56 is connected to the external connector 101 or 103 is also input to the controller 70 from another controller device. In practical applications, the controller 70 is an electronic control unit (ECU). The activation of the controller 70 corresponds to "startup of the vehicle." In the following description, a state in which the controller 70 is activated is referred to as "Ready-ON," and a state in which the controller 70 stops is referred to as "Ready-OFF."

Basic Operation of Electrically Powered Vehicle

A basic operation of an electrically powered vehicle having the above-described configuration will be briefly described below. When the electrically powered vehicle is turned Ready-ON, the system main relay 13 is turned ON, and a dc power from the main battery 10 is supplied via the step-up converter 14 and then the inverter 15 to the motor generators 16 and 18. The electrically powered vehicle is turned Ready-ON, for example, when a user turns the ignition switch 27 ON, when the vehicle is started up upon an external charging operation, or when the vehicle is automatically started up at a scheduled time through a scheduled startup function. To start driving the vehicle, the engine 20 is started up by starting up the first motor generator 16 in a state in which the electrically powered vehicle stops. An output from the engine 20 is split through the power dividing mechanism 22; some of the output drives the first motor generator 16, and the remaining output is output from the power dividing mechanism 22 together with an output from the second motor generator 18 serving as a motor to cause the wheels 26 to rotate. The first motor generator 16 serves as a generator, and generated ac power is consumed as driving power for the second motor generator 18. During this process, required power is supplied from the main battery 10 to the second motor generator 18 by discharging. On the other hand, when generated power from the first motor generator 16 is greater than the power required in the second motor generator 18, the generated excess ac power is converted to dc power through the inverter 15 and then charged to the main battery 10. To decelerate the electrically powered vehicle, the second motor generator 18 serves as a generator to slow down the rotation of the wheels 26. Ac power generated in this process is converted to dc power through the inverter 15 and then charged to the main battery 10.

Drive Control of Cooling Fan

Figure 2:
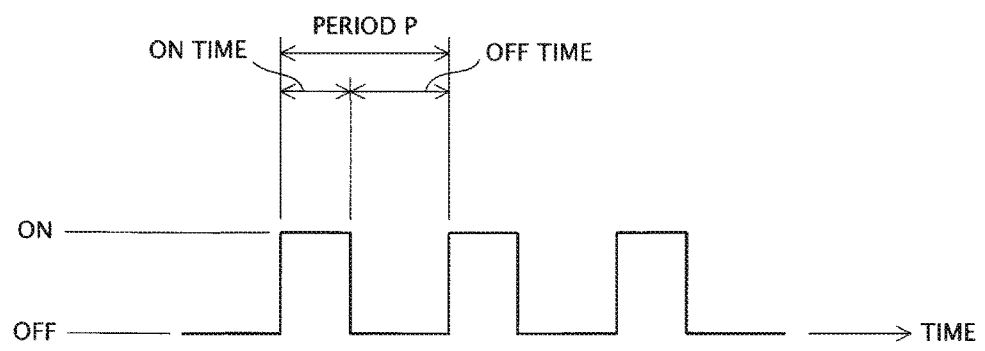
FIG. 2 illustrates duty control.

The rpm of the motor 44 of the cooling fan 40 is adjusted by duty control. The duty control is a control method in which, as illustrated in FIG. 2, a dc voltage applied to the motor 44 is periodically turned ON and OFF to change a duty, which is the ratio of the ON time to the ON-OFF period (P=ON time+OFF time). The duty is represented by the following equation (1):

$$\text{Duty}=\text{ON Time}/\text{Period }P=\text{ON Time}/(\text{ON Time}+\text{OFF Time}) \quad (1)$$

At a duty of zero, as no voltage is applied to the motor 44, the cooling fan 40 is not driven. At a duty of 100% (MAX duty), a voltage of a lower-voltage bus bar is, itself, applied to the motor 44. At a duty of somewhere between zero and 100%, a voltage obtained by multiplying a voltage of a lower-voltage bus bar by the duty; that is, an average voltage, is applied to the motor 44.

Figure 3:
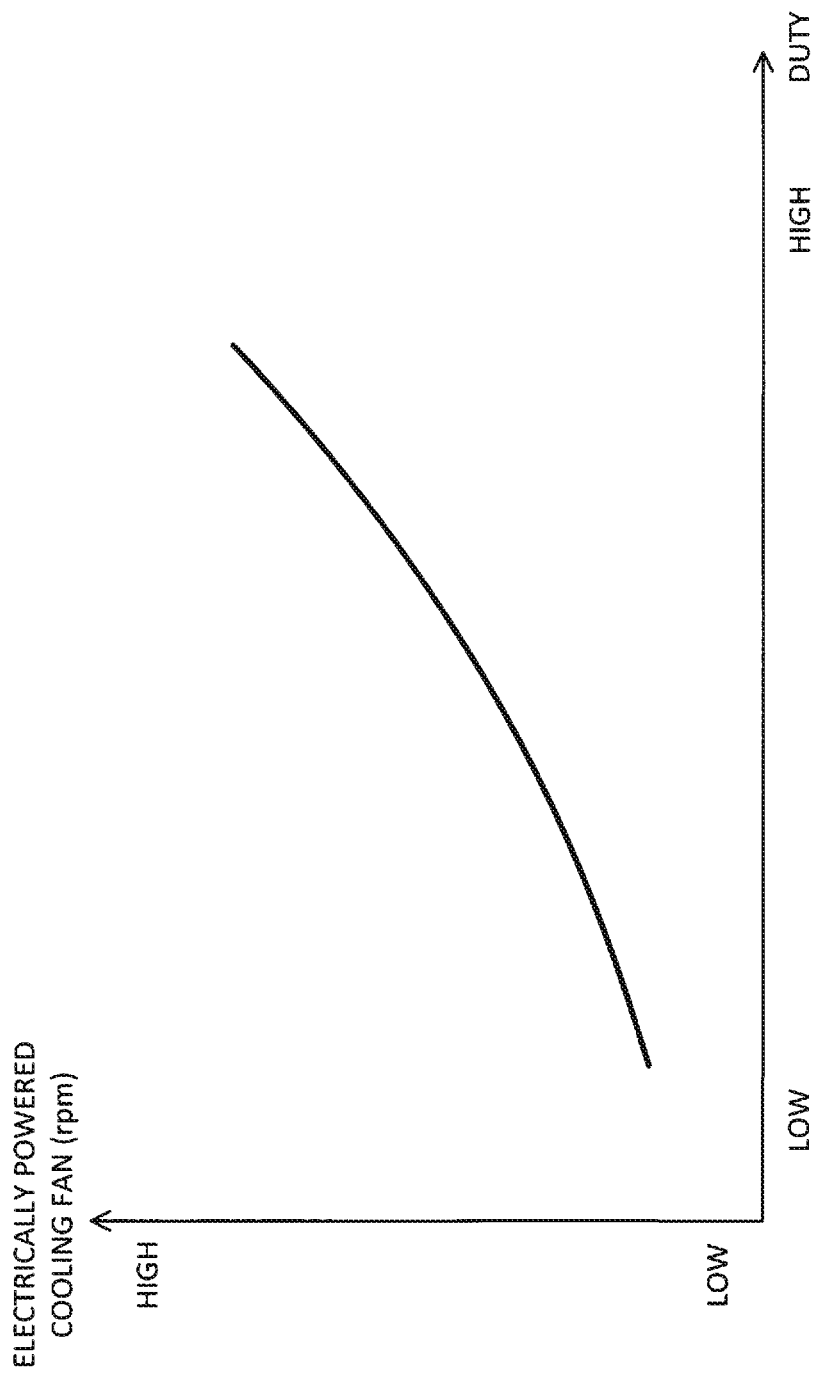
FIG. 3 is a graph illustrating a number of revolutions of a cooling fan with respect to a command duty.

Because, as illustrated in FIG. 3, a certain correlation is found between the rpm of the motor 44 and the duty, the rpm of the motor 44, and in turn, the rpm of the cooling fan 40 can be adjusted to a target level by adjusting the duty through the duty control. Also, because a certain correlation is found between the rpm of the cooling fan 40 and an air flow rate, the air flow rate of the cooling fan 40 can be adjusted to a target level by adjusting the duty. The control unit 45 of the cooling fan 40 includes therein a switching element for turning dc current ON or OFF, and turns ON or OFF dc current that is to be supplied to the motor 44, in accordance with a command duty D input from the controller 70.

In the illustrated embodiment, the cooling fan 40 is driven by variable duty control or constant duty control. In variable duty control, the controller 70 determines a command duty D for the cooling fan 40 in accordance with various types of detection parameters including at least the battery temperature TB, and outputs the command duty D to the control unit 45. Examples of detection parameters used as a reference for determining the command duty D may include not only the battery temperature TB but also, for example, an intake air temperature at the cooling fan 40 detected by the temperature sensor 66, a vehicle velocity Vel detected by the velocity sensor 65, a battery current IV, and driving conditions of the engine 20 or an air conditioner.

Figure 4:
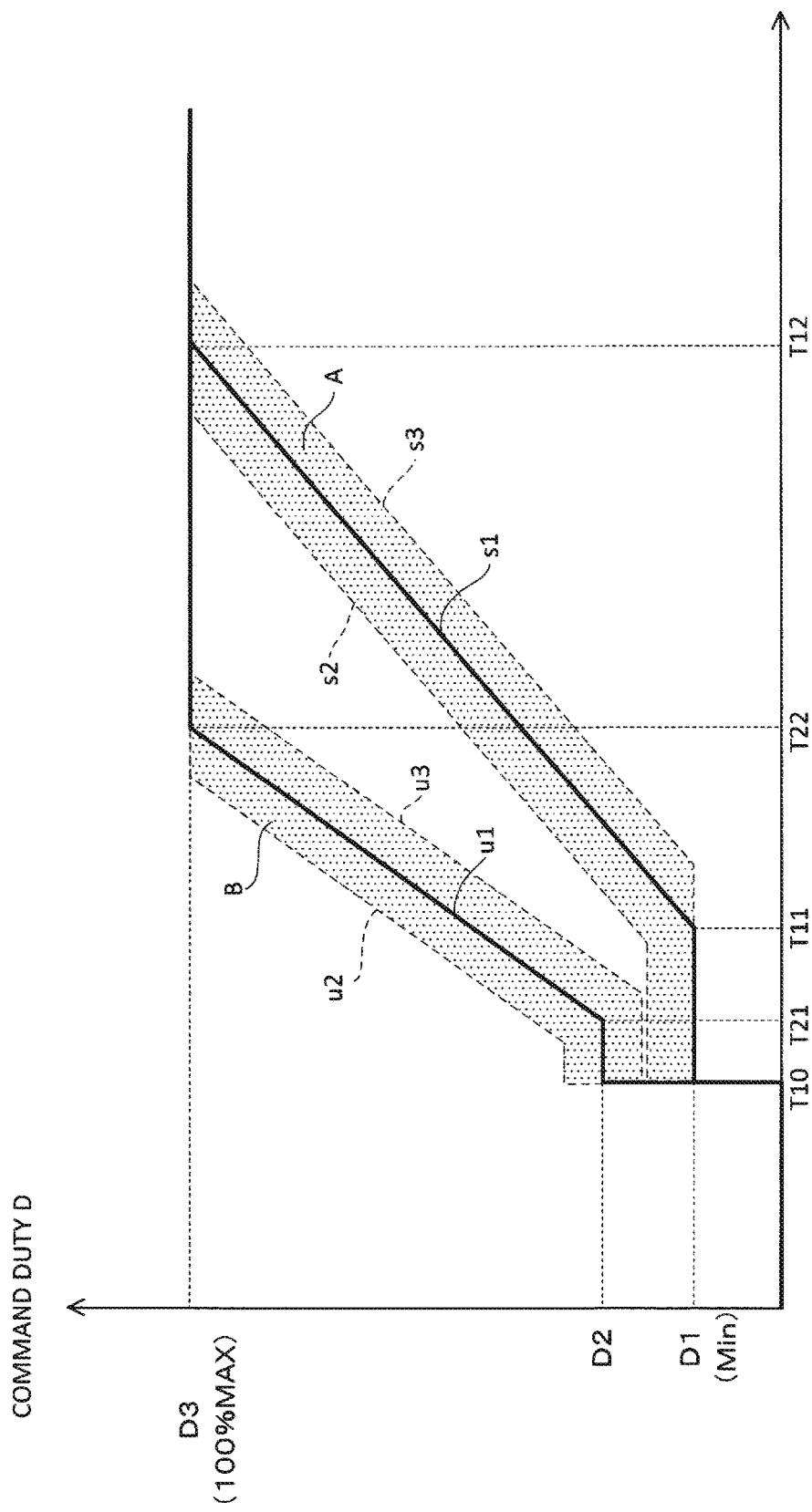
FIG. 4 illustrates duty maps for determining a command duty.

To determine the command duty D, in the illustrated embodiment, a duty map stored in the memory 72 of the controller 70 is used. The duty map represents a correlation between various types of detection parameter values and the command duty. The duty map may be in various forms, and one example is a map as illustrated in FIG. 4. A solid line s1 in FIG. 4 is a reference line defining a command duty D with which the sensitivity to the battery temperature TB is relatively low. The reference line s1 for the relatively low command duty D is used, for example, when an outside air temperature is near ordinary temperatures and a temperature difference ΔT between the battery temperature TB and the intake air temperature at the cooling fan 40 is large, or when a higher priority is placed on the reduction in power consumption than on the cooling performance. In this case, as indicated by the solid line s1 in FIG. 4, the command duty D is set to zero when the battery temperature TB is below a temperature T10, and is set to a minimum value D1 (MIN) when the temperature of the main battery 10 is between the temperature T10 and a temperature T11. The minimum value D1 is a minimum duty for stably controlling the rpm of the motor 44 through duty control, and is, for example, somewhere near 10%. After the battery temperature TB exceeds the temperature T11, the command duty D increases as the battery temperature TB increases, and the command duty D reaches a maximum value D3 (MAX, a duty of 100%) when the battery temperature TB reaches a temperature T12. The temperatures T10, T11, and T12 may take various values depending on, for example, the characteristics of the main battery 10, or the type of the battery (a nickel-metal hydride battery or a lithium ion battery), and, for example, the temperature T10 may be somewhere near 36° C., the temperature T11 may be somewhere near 38° C., and the temperature T12 may be somewhere near 47° C.

The command duty D is determined based on, in addition to the battery temperature TB, the velocity Vel of the electrically powered vehicle or other detection parameters. For example, when the velocity Vel of the electrically powered vehicle is high, because the required power is large and the input or output power of the main battery 10 is large, the command duty D is increased from the solid line s1 to a broken line s2 in FIG. 4. Conversely, when the velocity Vel of the electrically powered vehicle is low, because the required power is also small and the input or output power of the main battery 10 is not very large, the command duty D is decreased from the solid line s1 to a broken line s3 in FIG. 4. As described above, even when the battery temperature TB is maintained constant, the command duty D varies within a dot-hatched area A between the broken lines s2 and s3 in FIG. 4 depending on detection parameters such as the velocity Vel of the electrically powered vehicle. In the following description, the duty map defined by the solid line s1 and the broken lines s2 and s3 is referred to as a "low duty map."

A solid line u1 in FIG. 4 is a reference line defining a command duty D with which the sensitivity to the battery temperature TB is relatively high. The reference line u1 for the relatively high command duty ID is used, for example, when an outside air temperature is near ordinary temperatures and a temperature difference ΔT between the battery temperature TB and the intake air temperature at the cooling fan 40 is small, or, for example, when the main battery 10 should be cooled quickly. In this case, as indicated by the reference line u1, the command duty ID is set to zero when the battery temperature TB is below the temperature T10, and is set to a value D2 when the temperature of the main battery 10 is between the temperature T10 and a temperature T21 (which is lower than the temperature T11). The value D2 is larger than the minimum value D1 and is smaller than the maximum value D3. After the battery temperature TB exceeds the temperature T21, the command duty D increases as the battery temperature TB increases, and the command duty D reaches the maximum value D3 (MAX, a duty of 100%) when the battery temperature TB reaches a temperature T22. Here, the ratio of increase of the command duty with respect to the battery temperature TB is larger than the above-described case indicated by the solid line s1. The command duty D varies within a hatched area B between broken lines u2 and u3 in FIG. 4 depending on, for example, the velocity Vel of the electrically powered vehicle. As with the temperatures T10, T11, and T12, the temperatures T21 and T22 also may take various values, and, for example, the temperature T21 may be somewhere near 37° C., and the temperature T22 may be somewhere near 42° C. In the following description, the duty map defined by the solid line u1 and the broken lines u2 and u3 is referred to as a "high duty map."

In variable duty control, the controller 70 determines a command duty D for the cooling fan 40 based on a duty map as described above, and outputs the command duty D to the control unit 45. Which of the low duty map or the high duty map is to be used as a reference for determining the command duty D is determined in accordance with the battery temperature TB, a temperature difference ΔT between the battery temperature TB and the intake air temperature at the cooling fan 40, or the vehicle's driving conditions (such as driving conditions of the engine or driving conditions of the air conditioner). Although FIG. 4 illustrates only two duty maps (the high duty map and the low duty map), more than two duty maps may be stored. Further, although, in the illustrated embodiment, the command duty D is determined based on a map, the command duty D may be calculated based on a function including a detection parameter such as the battery temperature TB as a variable.

As described above, in the illustrated embodiment, constant duty control is also performed. In constant duty control, the controller 70 outputs a constant command duty D to the control unit 45 for a certain period of time. The command duty D used in the constant duty control is unchanged during a certain period of time, but may be changed to a different value each time the constant duty control is performed. The command duty D for the constant duty control is determined in accordance with, for example, the battery temperature TB or input or output power Wi or Wo, as will be described in detail below. In the illustrated embodiment, the cooling fan 40 is driven under the constant duty control, and, based on a differential Δω between an actual rpm obtained during the constant duty control and a target rpm, whether or not a malfunction occurs in the cooling fan 40 is determined.

Basic Operation of Cooling System for Vehicle-Mounted Secondary Battery

Next, an operation of a cooling system for a vehicle-mounted secondary battery will be described with reference to FIGS. 5 and 6. After a Ready-ON signal is input, at step S101 in FIG. 5, the controller 70 detects the battery temperature TB using the temperature sensor 61 and compares the detected temperature with a first temperature T0. The first temperature T0 is set in accordance with, for example, the heat resistance or heat generation properties of the main battery 10, and represents a lowest temperature at which or above which the main battery 10 should be forcedly air-cooled. The first temperature T0 is set to, for example, 36° C.

When the battery temperature TB is below the first temperature T0, the process proceeds to step S102, at which the controller 70 determines whether or not charging is continued for a predetermined period of time or longer. Such determination may be made by various methods. In the illustrated embodiment, the controller 70 determines that charging is continued for a predetermined period of time or longer when SOC recovery control is executed upon the SOC recovery switch 28 being turned ON, when SOC recovery control is executed upon the SOC dropping below a predefined lower threshold, or when external charging is started. If the period of time for which regenerative charging by vehicle's downhill driving or charging by regenerative braking when the brake is turned ON will be continued can be predicted from route information provided from the navigation system 30, a determination may be made on whether or not charging is continued for a predetermined period of time, and, in turn, whether or not the cooling fan 40 is driven by the constant duty control, based on the predicted period of time for which charging will be continued. When the controller 70 determines that charging is not continued for a predetermined period of time or longer (NO at step S102), the process returns to step S101, at which the controller 70 again compares the battery temperature TB with the first temperature T0. When the controller 70 determines that charging is continued for a predetermined period of time or longer (YES at step S102), the process proceeds to step S104, at which the controller 70 drives the cooling fan 40 by the constant duty control. The constant duty control is control through which the cooling fan 40 is driven at a constant duty for a certain period of time, as will be described in detail below. In addition to the execution of the constant duty control, a malfunction detection process (S105) is performed. The malfunction detection process is a process through which a determination is made as to whether or not a malfunction occurs in the cooling fan 40, based on an actual rpm of the cooling fan 40 obtained while the cooling fan 40 is being driven under the constant duty control. The controller 70 detects an actual rpm of the motor 44 using the rpm sensor 64 illustrated in FIG. 1, determines whether or not a malfunction occurs, in accordance with a difference Δω between a certain target rpm determined based on the command duty D and the actual rpm, and outputs a signal indicating the result of the determination to, for example, a diagnosis system.

When the battery temperature TB is at or above the first temperature T0, the process proceeds to step S107, at which the controller 70 determines whether or not the battery temperature TB is below a second temperature T1. The second temperature T1 is higher than the first temperature T0, and is, for example, somewhere near 40° C. When the determination at step S107 is YES, or, in other words, T0≤TB<T1, the process proceeds to step S104, at which the controller 70 drives the cooling fan 40 by the constant duty control.

When the battery temperature TB is at or above the second temperature T1, the controller 70 drives the cooling fan 40 by variable duty control in which the command duty D is changed in accordance with at least the battery temperature TB (S109 and S110). The duty map used as a reference for determining the command duty D for the variable duty control is changed in accordance with the battery temperature TB. Specifically, when the battery temperature TB is at or above the second temperature T1, the process proceeds to step S108, at which the controller 70 compares the battery temperature TB with a third temperature T2. The third temperature T2 is higher than the second temperature T1, and is, for example, somewhere near 45° C. When the determination at step S108 is YES, or, in other words, T1≤TB<T2, the process proceeds to step S109, at which the controller 70 performs the variable duty control based on the low duty map defined by the solid line s1 and the broken lines s2 and s3 in FIG. 4. When the determination at step S108 is No, or, in other words, T2≤TB, the process proceeds to step S110, at which the controller 70 performs the variable duty control based on the high duty map defined by the solid line u1 and the broken lines u2 and u3 in FIG. 4.

After the variable duty control is executed for a certain period of time at step S109 or S110, the process returns to step S101, and the controller 70 again determines the level of the battery temperature TB (S101, 107, and 108) and/or determines whether or not charging is performed (S102). The execution of the above-described steps is repeated in accordance with the battery temperature TB or the state of charge until the process finally proceeds to step S104 at which the cooling fan 40 is driven at a constant duty.

When the battery temperature TB is at or above the first temperature T0 and below the second temperature T1 (YES at step S107), or when the battery temperature TB does not reach the first temperature T0 but charging is continued for a predetermined period of time or longer (YES at step S102), as described above, the process proceeds to step S104, at which the cooling fan 40 is driven by the constant duty control, and additionally, a malfunction detection process (S105) is performed based on the rpm obtained during the constant duty control. After that, the cooling fan 40 is driven by the variable duty control based on the duty map in FIG. 4 (S106) until the state is turned Ready-OFF.

The above-described operation is employed for reasons that will be described below. The variable duty control in which the command duty D is changed in accordance with, for example, the battery temperature TB can cool the main battery 10 efficiently and adequately, but has a drawback in that it is difficult to determine whether or not a malfunction occurs in the cooling fan 40. Typically, whether or not a malfunction occurs in the cooling fan 40 is often determined based on a parameter detected while the cooling fan 40 is being actually driven; for example, an actual rpm. For example, whether or not a malfunction occurs in the cooling fan 40 is determined based on a comparison between an actual rpm that is actually obtained while the cooling fan 40 is being driven at a specific command duty D and a target rpm that is expected to be achieved at that command duty D. Such determination should be performed under a steady state in which the command duty D is stable at a constant value. The reason is that significant fluctuations in command value to the cooling fan 40 tend to cause, for example, delays in control, and therefore impair the accuracy in determining whether or not a malfunction occurs. To address this situation, it is possible to continuously drive the cooling fan at a constant duty (constant rpm) without changing the command duty (command rpm) for the cooling fan 40. In this case, because the driving conditions of the cooling fan 40 are continuously stable, whether or not a malfunction occurs can be determined accurately. However, if the cooling fan is continuously driven at a constant duty (constant rpm) regardless of the state of the main battery 10 or the vehicle's driving conditions, there are problems in that an insufficient rpm leads to degradation of the main battery 10 as it is not cooled sufficiently, and conversely, an unnecessarily high rpm causes excessive noise or power consumption.

In consideration of the above, in the illustrated embodiment, the constant duty control in which the cooling fan 40 is driven at a constant duty (constant command value) for a certain period of time is executed only when specific conditions are satisfied, thereby providing an opportunity for a malfunction detection process. In the illustrated embodiment, the constant duty control is executed when the battery temperature TB is at or above the first temperature T0 and below the second temperature T1. In the illustrated embodiment, the constant duty control is executed when, although the battery temperature TB does not reach the first temperature T0, it can be determined that charging is continued for a predetermined period of time or longer. The constant duty control and the malfunction detection process are performed under the above-described conditions for reasons that will be described below.

Typically, a period starting from a startup (Ready-ON) of a vehicle until the drive is stopped (Ready-OFF) after a certain length of vehicle's driving is referred to as a "trip." To detect a malfunction of the cooling fan 40 early, the ratio of trips for which the malfunction detection process is performed ("inspected trips") should be at or above a certain level (for example, 60%), and the ratio of trips for which no malfunction detection process is performed ("uninspected trips") should be below a certain level (for example, 40%).

Obviously, the ratio of uninspected trips can be reduced by executing the malfunction detection process for each trip. However, executing the malfunction detection process, and, in turn, driving the cooling fan 40 by the constant duty control in a state in which the battery temperature TB is low (in other words, in a state in which cooling by the cooling fan 40 is unnecessary), will overcool the main battery 10, and may deteriorate the charging and discharging characteristics of the main battery 10 or may waste power. On the other hand, executing the malfunction detection process, and, in turn, driving the cooling fan 40 by the constant duty control in a state in which the battery temperature TB is high to a certain level, may result in insufficient cooling of the main battery 10. In consideration of the above, in the illustrated embodiment, the constant duty control is performed when the battery temperature TB is at or above the first temperature T0 and below the second temperature T1.

Further, as it is expected that the temperature of the main battery 10 will increase rather quickly during charging, even if driving the cooling fan 40 is started before the battery temperature TB reaches the first temperature T0, it is unlikely that the main battery 10 will be overcooled. Also, during charging, extra power is usually available, and, in most cases, power consumption for driving the cooling fan 40 will cause no problem. In consideration of the above, in the illustrated embodiment, when it is expected that charging to the main battery 10 is continued for a predetermined period of time or longer after the startup of the vehicle, a higher priority is given to providing an opportunity for the malfunction detection process, and the constant duty control is performed even though the battery temperature TB does not reach the first temperature T0. By doing so, the ratio of uninspected trips can be effectively reduced. Because it is sufficient if the constant duty control and the malfunction detection process are performed once in one trip, after the constant duty control and the malfunction detection process are executed once, the constant duty control and the malfunction detection process are not performed any more until the end of that trip.

Constant Duty Control

Next, the constant duty control of the cooling fan 40 at step S104 in FIG. 5 will be described in detail below with reference to FIG. 6. The constant duty control of the cooling fan 40 is control in which the cooling fan 40 is rotated at a constant command duty D for a certain period of time. The command duty D for the constant duty control is changed in accordance with, for example, the battery temperature TB or input or output power Wi or Wo. Specifically, in the constant duty control, first, at step S201 in FIG. 6, the controller 70 determines whether or not the battery temperature TB exceeds the first temperature T0 for the first time after the battery temperature TB is increased from below the first temperature T0. When the controller 70 determines that the condition of step S201 is satisfied, the process jumps from step S201 to step S207, at which the controller 70 holds the command duty D at the minimum value D1 of the duty map in FIG. 4 for a certain period of time. By doing so, the cooling fan 40 is controlled to rotate at a certain target rpm (minimum rpm). The controller 70 detects an actual rpm of the motor 44, or, in other words, an actual rpm of the cooling fan 40, using the rpm sensor 64. The controller 70 then compares a certain target rpm determined based on the command duty D with the actual rpm. When the difference $\Delta\omega$ between the target rpm and the actual rpm or the absolute value of that difference $\Delta\omega$ is at or above a predetermined threshold, the controller 70 outputs a fan malfunction signal to, for example, a diagnosis system, determining that a malfunction occurs in the cooling fan 40. On the other hand, when the rpm difference $\Delta\omega$ or the absolute value of the difference $\Delta\omega$ is below the predetermined threshold, the controller 70 outputs a fan normal-function signal to, for example, the diagnosis system, determining that no malfunction occurs in the cooling fan 40. The certain period of time in this process is a length of time within which a difference between an actual rpm of the cooling fan 40 and a target rpm determined based on the command duty can be determined, and is, for example, somewhere in a range of from tens of seconds to several minutes.

When the determination at step S201 is NO, the process proceeds to step S202, at which the controller 70 determines whether or not the condition described below is satisfied. First, the controller 70 calculates input power Wi input to the main battery 10 from a voltage applied across the main battery 10, which is detected using the voltage sensor 62 of FIG. 1, and a current flowing from the main battery 10, which is detected using the current sensor 63 of FIG. 1. When the input power Wi (charging power) input to the main battery 10 is less than a predetermined threshold Wi_Lo, the controller 70 determines YES at step S202 in FIG. 6, and the process proceeds to step S203 in FIG. 6.

When the controller 70 determines YES at step S202, the process proceeds to step S203, at which the controller 70 determines whether or not output power No is less than a predetermined threshold Wo_Lo. First, the controller 70 calculates output power Wo output from the main battery 10 from a voltage applied across the main battery 10, which is detected using the voltage sensor 62, and a current flowing from the main battery 10, which is detected using the current sensor 63, and compares the output power Wo with the predetermined threshold Wo_Lo. When the output power Wo output from the main battery 10 is less than the predetermined threshold Wo_Lo, the process proceeds to step S207. In this case, as both the input power Wi and the output power Wo are low, the increase in temperature of the main battery 10 is also small. Therefore, the controller 70 determines that the air flow rate of the cooling fan 40 does not have to be high, and the process jumps to step S207, at which the cooling fan 40 is driven by the constant duty control with the command duty D being set to the minimum value D1. When the input power Wi input to the main battery 10 is at or above the predetermined threshold Wi_Lo, or when the output power Wo is at or above the predetermined threshold Wo_Lo, the process proceeds to step S204, at which the controller 70 determines whether or not the condition described below is satisfied.

As described above, in steps S201 through S203 in FIG. 6, the controller 70 determines whether or not the following specific conditions are satisfied: (1) whether or not the battery temperature TB exceeds the first temperature T0 for the first time after the battery temperature TB is increased from below the first temperature T0; and (2) whether or not the input or output power to or from the main battery 10 is low. When one of these specific conditions is satisfied, the process jumps to step S207, at which the cooling fan 40 is driven by the constant duty control with the command duty ID being set to the minimum value D1 for a certain period of time. By doing so, it is possible to prevent the main battery 10 from being overcooled and to suppress the power consumption resulting from driving the cooling fan 40.

When the controller 70 determines that none of the specific conditions is satisfied, the process proceeds to step S204, at which the controller 70 determines whether or not the battery temperature TB is higher than a reference temperature Tc. The reference temperature Tc is equal to or above the first temperature T0, and is below the second temperature T1 at which or above which the constant duty control of the cooling fan 40 is inhibited. As described above, the second temperature T1 may vary depending on, for example, the frequency with which the malfunction detection process of the cooling fan 40 is performed, and may be set to, for example, 40° C. When, as in the above-described example, the first temperature T0 is set to 36° C., the reference temperature Tc is at or above 36° C. and below 40° C., and may be set to, for example, 38° C.

When the controller 70 determines that the battery temperature TB exceeds the reference temperature Tc, and, for example, that the battery temperature TB is at 39° C., which satisfies the conditions of being at or above the first temperature T0 (36° C.), being below the second temperature T1 (40° C.), and being above the reference temperature Tc (38° C.), the controller 70 proceeds to step S205. At step S205, the controller 70 holds the command duty D to be constant at the maximum value D3 of the duty map in FIG. 4. By doing so, the cooling fan 40 is controlled to rotate at a certain target rpm (maximum rpm). Similarly as with the operation described above, the controller 70 detects an actual rpm of the motor 44 using the rpm sensor 64 in FIG. 1, and then compares a certain target rpm determined based on the command duty D with the actual rpm to determine whether or not a malfunction occurs, based on the difference $\Delta\omega$ between the target rpm and the actual rpm or the absolute value of that difference $\Delta\omega$. When, as described above, the battery temperature TB is relatively high, there is no risk that cooling the main battery 10 by driving the cooling fan 40 at the maximum rpm will overcool the main battery 10, and, rather, the main battery 10 should be cooled. Therefore, when the battery temperature TB is relatively high, the controller 70 drives the cooling fan 40 with the command duty D being set to be constant at the maximum value D3.

When the controller 70 determines that the battery temperature TB is at or below the reference temperature Tc; for example, that the battery temperature TB is at 37° C., which satisfies the conditions of being at or above the first temperature T0 (36° C.), being below the second temperature T1 (40° C.), and being at or below the reference temperature Tc (38° C.), the controller 70 proceeds to step S206. At step S206, the controller 70 holds the command duty D to be constant at an intermediate value DM which is a value somewhere between the maximum value D3 and the minimum value D1 of the duty map in FIG. 4. By doing so, the cooling fan 40 is controlled to rotate at a certain target rpm (intermediate rpm). Similarly as with the operation described above, the controller 70 detects an actual rpm of the motor 44 using the rpm sensor 64 in FIG. 1 to determine whether or not a malfunction occurs, based on a difference $\Delta\omega$ between a certain target rpm determined based on the command duty D and the actual rpm, and outputs a signal indicating the result of the determination to, for example, the diagnosis system.

After the constant duty control is performed at one of steps S205, S206, and S207, the controller 70 ends the process.

Next, example operations of a cooling system for a vehicle-mounted secondary battery will be described with reference to FIGS. 7 to 10. In each of FIGS. 7 to 10, which are charts illustrating example operations of a cooling system, an upper chart illustrates the command duty D, and a lower chart illustrates the battery temperature TB.

Example Operation 1

An operation of a cooling system for a vehicle-mounted secondary battery for a case where the battery temperature TB is below the first temperature T0 during Ready-ON and no charging is performed will be described with reference to FIG. 7. At time t0 in FIG. 7, a Ready-ON signal is input to the controller 70. The state immediately before time t0 is Ready-OFF, in which the electrically powered vehicle and the cooling fan 40 are stopped, and the command duty D for the cooling fan 40 is zero. The battery temperature TB immediately before time t0 is at a temperature Ta that is lower than the first temperature T0.

At time t0, the state is turned Ready-ON, and the controller 70 first compares the battery temperature TB with the first temperature T0. When the battery temperature TB is below the first temperature T0, the controller 70 further determines whether or not charging is continued for a predetermined period of time or longer. In the example illustrated in FIG. 7, at time t0, the battery temperature TB (Ta) is below the first temperature T0, and no charging is performed. Therefore, in this case, the controller 70 does not drive the cooling fan 40 and leaves the cooling fan 40 on standby until the battery temperature TB reaches the first temperature T0 or until it is predicted that charging will be continued for a predetermined period of time or longer.

The battery temperature TB gradually increases after the startup of the vehicle, and, in this example, at time t1, the battery temperature TB reaches the first temperature T0. Then, the controller 70 drives the cooling fan 40 at the constant command duty D for a certain period of time. Additionally, there is performed a malfunction detection process for determining whether or not a malfunction occurs in the electrically powered cooling fan 40. At time t1, the condition that "the battery temperature TB exceeds the first temperature T0 for the first time after the battery temperature TB is increased from below the first temperature T0" is satisfied, and the determination at step S201 in FIG. 6 is YES. Therefore, at time t1, the command duty D for the constant duty control is set to the minimum duty D1 in FIG. 4.

After a lapse of a certain period of time from the time at which driving the cooling fan 40 under the constant duty control is started, the controller 70 ends the constant duty control of the cooling fan 40, and proceeds to the variable duty control. Specifically, the controller 70 determines the command duty D that varies in accordance with, for example, the battery temperature TB, based on the duty map in FIG. 4, and drives the cooling fan 40 with the variable command duty D. By doing so, as illustrated in the upper chart of FIG. 7, the command duty D for the cooling fan 40 varies in accordance with, for example, the battery temperature TB.

Example Operation 2

Figure 8:
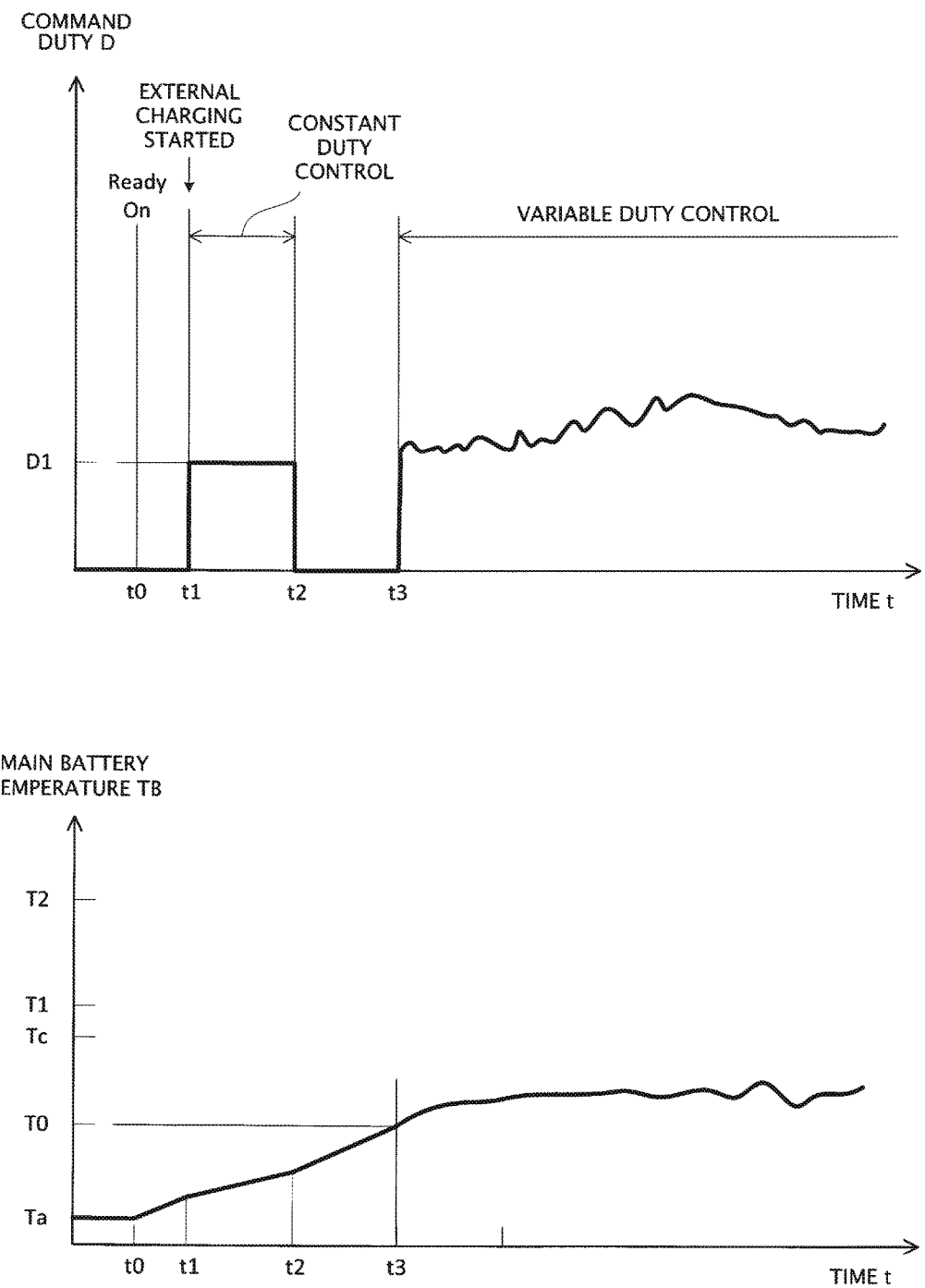
FIG. 8 is a time chart illustrating the command duty for the cooling fan and the battery temperature for a case where the battery temperature is below the first temperature T0 during startup and charging is performed.

Next, an operation of a cooling system for a vehicle-mounted secondary battery for a case where the battery temperature TB is below the first temperature T0 during Ready-ON and charging is performed will be described with reference to FIG. 8. Similarly as with the example illustrated in FIG. 7, at time t0, the state is turned Ready-ON, and the battery temperature TB (Ta) is below the first temperature T0. When the battery temperature TB is below the first temperature T0, the controller 70 then determines whether or not charging is continued for a predetermined period of time or longer. In the example illustrated in FIG. 8, at time t0, the battery temperature TB (Ta) is below the first temperature T0, and no charging is performed. Therefore, in this case, the controller 70 does not drive the cooling fan 40 and leaves the cooling fan 40 on standby until the battery temperature TB reaches the first temperature T0 or until it is predicted that charging will be continued for a predetermined period of time or longer.

After that, at time t1, in this case, external charging is started. External charging is usually continued for some period of time. Therefore, at time t1, the controller 70 determines that charging will be continued for a predetermined period of time or longer. Then, even though the battery temperature TB is below the first temperature T0, the controller 70 starts driving the cooling fan 40 by the constant duty control. Additionally, whether or not a malfunction occurs is determined based on an actual rpm obtained during the constant duty control and a target rpm. After a lapse of a certain period of time from the time at which the constant duty control is started, or, at time t2, if the battery temperature TB does not reach the first temperature T0, the controller 70 stops driving the cooling fan 40.

After that, the battery temperature TB gradually increases, and, in this example, at time t3, the battery temperature TB reaches the first temperature T0. Then, the cooling fan 40 is driven to cool the main battery 10. At this time, as the constant duty control has already been performed, the constant duty control is not performed again, and there is performed the variable duty control for which the command duty is changed in accordance with the battery temperature TB.

Example Operation 3

Next, an operation of a cooling system for a vehicle-mounted secondary battery for a case where the battery temperature TB is at or above the first temperature T0 and below the second temperature T1 during Ready-ON and external charging is started at time t2 after startup will be described with reference to FIG. 9. In FIG. 9, the thick solid lines illustrate a case where the determination is YES at step S201 or S203 of FIG. 6, and the broken lines illustrate a case where the determination is NO at all of steps S201, S202, and S204 of FIG. 6.

As illustrated in FIG. 9, at time t0, the state is turned Ready-ON, and the battery temperature TB (Ta) is at or above the first temperature T0 and below the second temperature T1. When the battery temperature TB at time t0 is at or above the first temperature T0 and below the second temperature T1, the controller 70 starts the constant duty control simultaneously with the startup. Additionally, whether or not a malfunction occurs in the cooling fan 40 is determined based on a differential between an actual rpm obtained during the constant duty control and a target rpm. The command duty D for the constant duty control is set to the minimum value D1 as illustrated by the thick solid line when the determination is YES at step S201 or S203; for example, when input power Wi is less than a predefined threshold Wi_Lo. On the other hand, the command duty for the constant duty control is set to the intermediate value DM as illustrated by the broken line when the determination is NO at all of steps S201, S202, and S204.

After the constant duty control ends, only the variable duty control for which the command duty is changed in accordance with, for example, the battery temperature TB is performed. Therefore, for example, at time t2, which is after performance of the constant duty control, although external charging is started, the variable duty control is continued.

Example Operation 4

Next, an operation of a cooling system for a vehicle-mounted secondary battery for a case where the battery temperature TB is at or above the second temperature T1 during Ready-ON and external charging is started at time t1 after startup will be described with reference to FIG. 10. As illustrated in FIG. 10, at time t0, the state is turned Ready-ON, and the battery temperature TB (Ta) is at or above the second temperature T1 and below the third temperature T2. Then, simultaneously with the startup, the controller 70 drives the cooling fan 40 under the variable duty control for which the command duty is changed in accordance with, for example, the battery temperature TB. The variable duty control is continued until the battery temperature TB drops below the second temperature T1. Therefore, at time t1, although external charging is started, the variable duty control is continued. At time t2, if the battery temperature TB drops below the second temperature T1, the constant duty control is then started. Additionally, whether or not a malfunction occurs is determined based on a differential between an actual rpm obtained during the constant duty control and a target rpm. At this time, as the battery temperature TB exceeds the reference temperature Tc, the command duty D is set to the maximum value D3. After the constant duty control ends, the variable duty control is continued.

Although, in the example illustrated in FIG. 10, the battery temperature TB drops below the second temperature T1 by continuing the variable duty control, if the battery temperature TB does not drop below the second temperature T1 by continuing the variable duty control, the controller 70 does not perform the constant duty control or an inspection for a malfunction, and continues the variable duty control until the state is turned Ready-OFF. In this case, the trip is an uninspected trip for which no malfunction detection process is performed.

Change of Setting of Second Temperature T1

In a cooling system for a vehicle-mounted secondary battery according to one or more of the above-described embodiments, the constant duty control of the cooling fan 40 is inhibited when the battery temperature TB is at or above the second temperature T1 during Ready-ON. Therefore, when the second temperature T1 is low, the constant duty control of the cooling fan 40 is inhibited over a wide temperature range, resulting in fewer opportunities to perform the malfunction detection process. Conversely, when the second temperature T1 is high, the constant duty control is inhibited over a narrow temperature range, resulting in increased opportunities to perform the malfunction detection process. In other words, the opportunity for the malfunction detection process can be adjusted by adjusting the second temperature T1. The second temperature T1 may be changed in accordance with, for example, the degree of degradation of the main battery 10, the ratio of trips for which the malfunction detection process is performed ("inspected trips"), or a period during which no malfunction detection process is performed.

During the malfunction detection process of the cooling fan 40, the command duty D is maintained constant to maintain the rpm of the cooling fan 40 constant. Therefore, during the malfunction detection process, as the main battery 10 is out of temperature control, an increase in temperature of the main battery 10 may accelerate the degradation of the main battery 10. The degradation due to high temperatures does not always proceed at the same rate; a greater degree of degradation of the main battery 10 leads to a greater degradation rate. Conversely, the degradation hardly proceeds when the main battery 10 is fresh, with almost no degradation.

Therefore, when the main battery 10 is brand new, or when the degree of degradation of the main battery is low, the second temperature T1 may be set to be higher than when the degree of degradation of the main battery 10 is high. In this case, the opportunity for the malfunction detection process of the cooling fan 40 can be increased without significantly affecting the performance of the main battery 10. Conversely, when the degree of degradation of the main battery is high, the second temperature T1 may be set to be lower than when the degree of degradation of the main battery 10 is low. By doing so, the degradation of the main battery 10 can be suppressed.

The degree of degradation of the main battery 10 may be defined by various methods; for example, it may be defined by the ratio of decrease in SOC per unit time for outputting a predetermined level of power or the magnitude of internal resistance.

By changing the second temperature T1 in accordance with the circumstances in this manner, an adequate opportunity for the malfunction detection process can be provided while avoiding the degradation of the main battery 10. As the second temperature T1, the third temperature T2, and the reference temperature Tc are in the relationship of Tc<T1<T2, a change in the second temperature T1 may induce a change in the third temperature T2 or the reference temperature Tc associated with the second temperature T1 to satisfy the relationship of Tc<T1<T2. As described above, a cooling system for a vehicle-mounted secondary battery according to one or more of the illustrated embodiments and an electrically powered vehicle having such a cooling system mounted therein can adequately cool the vehicle-driving main battery 10 while providing a sufficient opportunity for detecting whether or not a malfunction occurs in the cooling fan 40.

Figure 11:
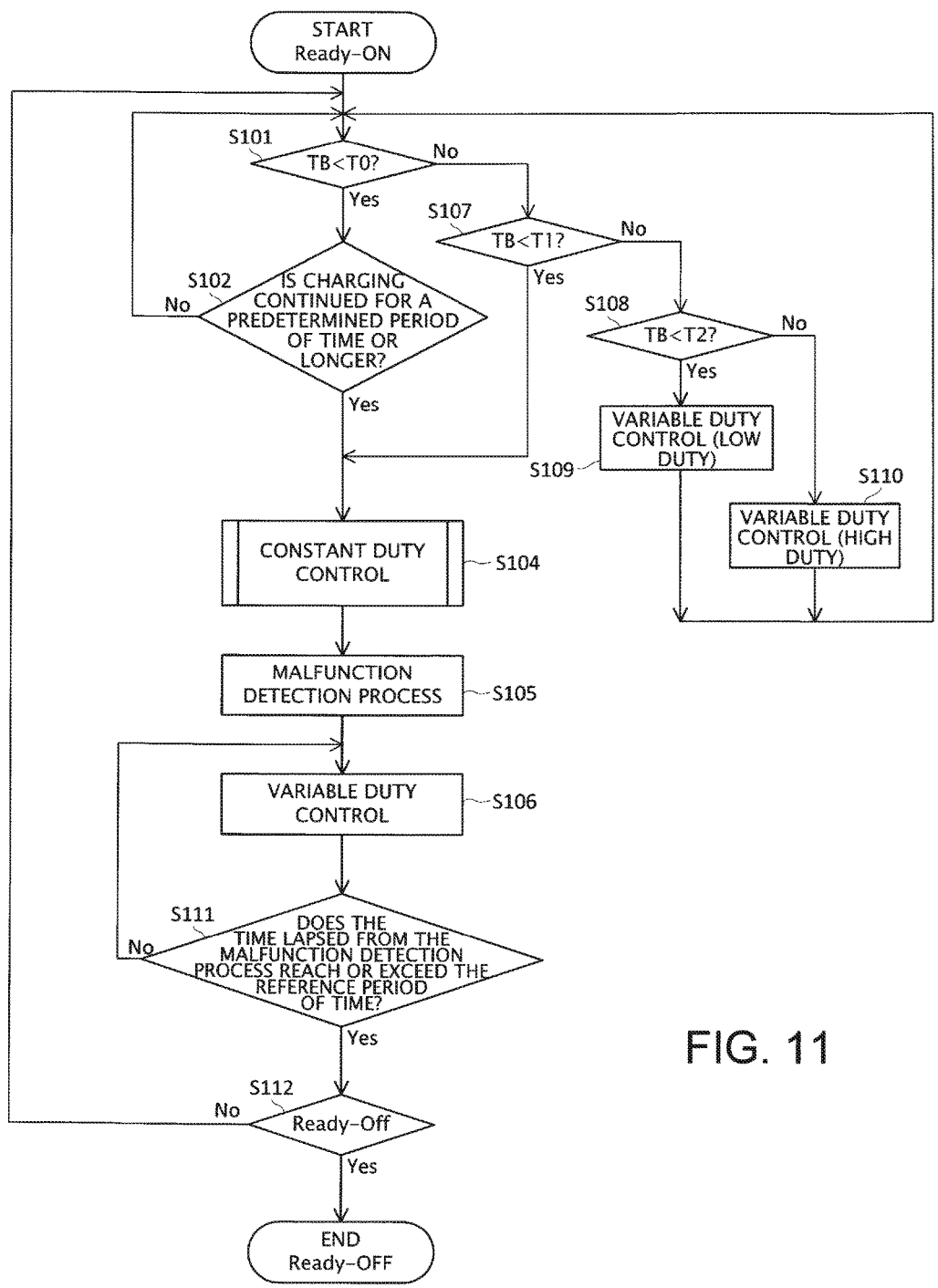
FIG. 11 is a flowchart illustrating another operation of a cooling system for a vehicle-mounted secondary battery.

Although in one or more of the above-described embodiments the malfunction detection process for the cooling fan 40 is performed once for one trip, it may be performed a plurality of times during one trip. For example, as illustrated at step S111 in FIG. 11, whether or not the time lapsed from the malfunction detection process reaches or exceeds a reference period of time may be determined periodically. In some embodiments, if it is determined that the lapsed time reaches or exceeds the reference period of time, as illustrated at step S112, the process returns to step S101, from which whether or not the execution conditions for the constant duty control are satisfied is again checked, and, if the execution conditions are satisfied, the constant duty control and the malfunction detection process are performed. Repeating the constant duty control and the malfunction detection process periodically in this manner allows early detection of a malfunction of the cooling fan 40.

Although, in one or more of the above-described embodiments, the controller 70 is configured to calculate the command duty D and output the result, in other embodiments, the control unit 45 of the cooling fan 40 may calculate the command duty D and may control the motor 44. Specifically, in some embodiments, the controller 70 may output information for controlling the driving of the cooling fan 40, such as the battery temperature TB, to the control unit 45, and the control unit 45 may calculate the duty for driving the cooling fan 40 based on the supplied information. Although, in one or more of the illustrated embodiments, the cooling fan 40 is driven by the motor 44, in some embodiments, the cooling fan 40 may be driven by an ac motor. In this case, the control unit 45 may generate an ac drive waveform in accordance with the duty to control the rpm of the ac motor.

Figure 5:
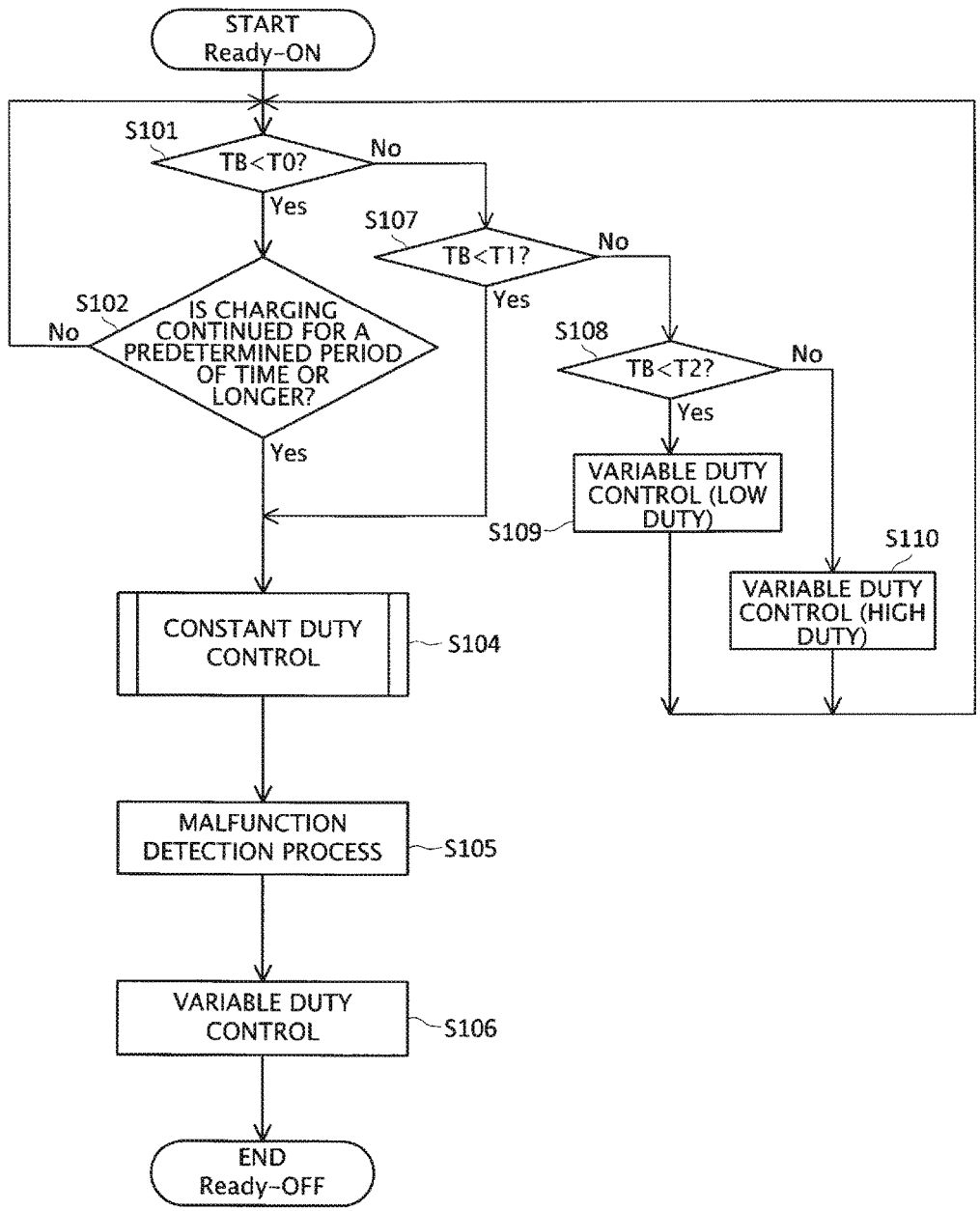
FIG. 5 is a flowchart illustrating an operation of a cooling system for a vehicle-mounted secondary battery according to an embodiment of the present invention.
Figure 12:
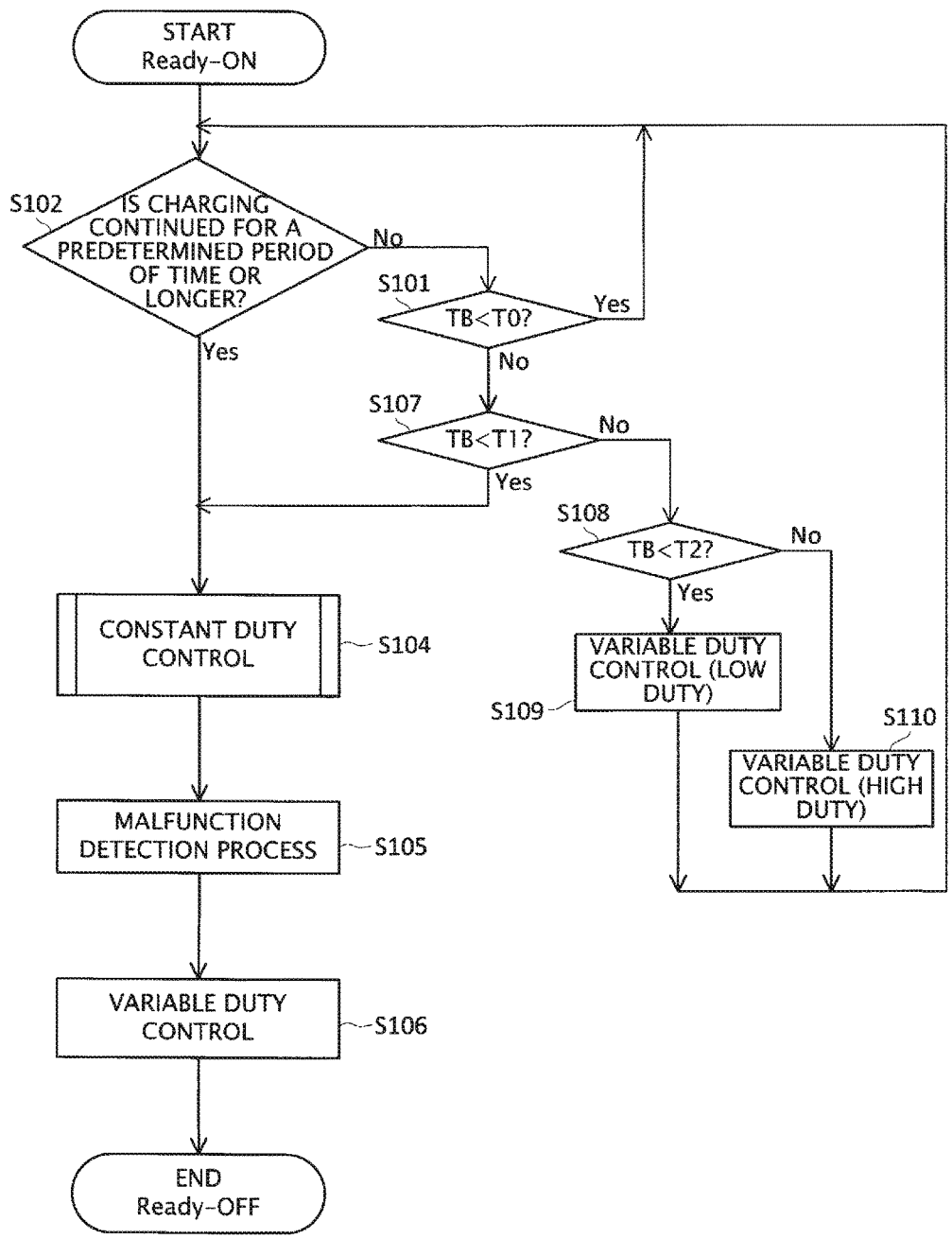
FIG. 12 is a flowchart illustrating another operation of a cooling system for a vehicle-mounted secondary battery.

In the example illustrated in FIG. 5, when the battery temperature TB immediately after the startup of the vehicle is at or above the second temperature T1 (NO at step S107), the constant duty control is not performed, and the variable duty control is performed. However, when charging is continued for a predetermined period of time or longer, the constant duty control may be performed regardless of whether the battery temperature TB is high. Specifically, as illustrated in FIG. 12, whether or not charging is continued for a predetermined period of time or longer may be determined (S102) before the determination of the battery temperature TB (steps S101, S107, and S108). In some embodiments, the determination of the battery temperature TB is performed when the determination is NO at S102, and the constant duty control is performed (S104) regardless of the battery temperature TB when the determination is YES at S102.

In one or more of the illustrated embodiments, when charging is continued for a predetermined period of time or longer, the constant duty control is performed even if the battery temperature TB is very low (for example, below 0° C.). In some other embodiments, when the battery temperature TB is very low, the constant duty control is not performed until the battery temperature TB reaches or exceeds a predetermined temperature (for example, 0° C.). In this case, after the battery temperature TB reaches or exceeds the predetermined temperature, the constant duty control is performed even if the battery temperature TB is below the first temperature T0. Therefore, it is possible to adequately cool the vehicle-driving main battery 10 while providing a sufficient opportunity for detecting whether or not a malfunction occurs in the cooling fan 40.

Figure 6:
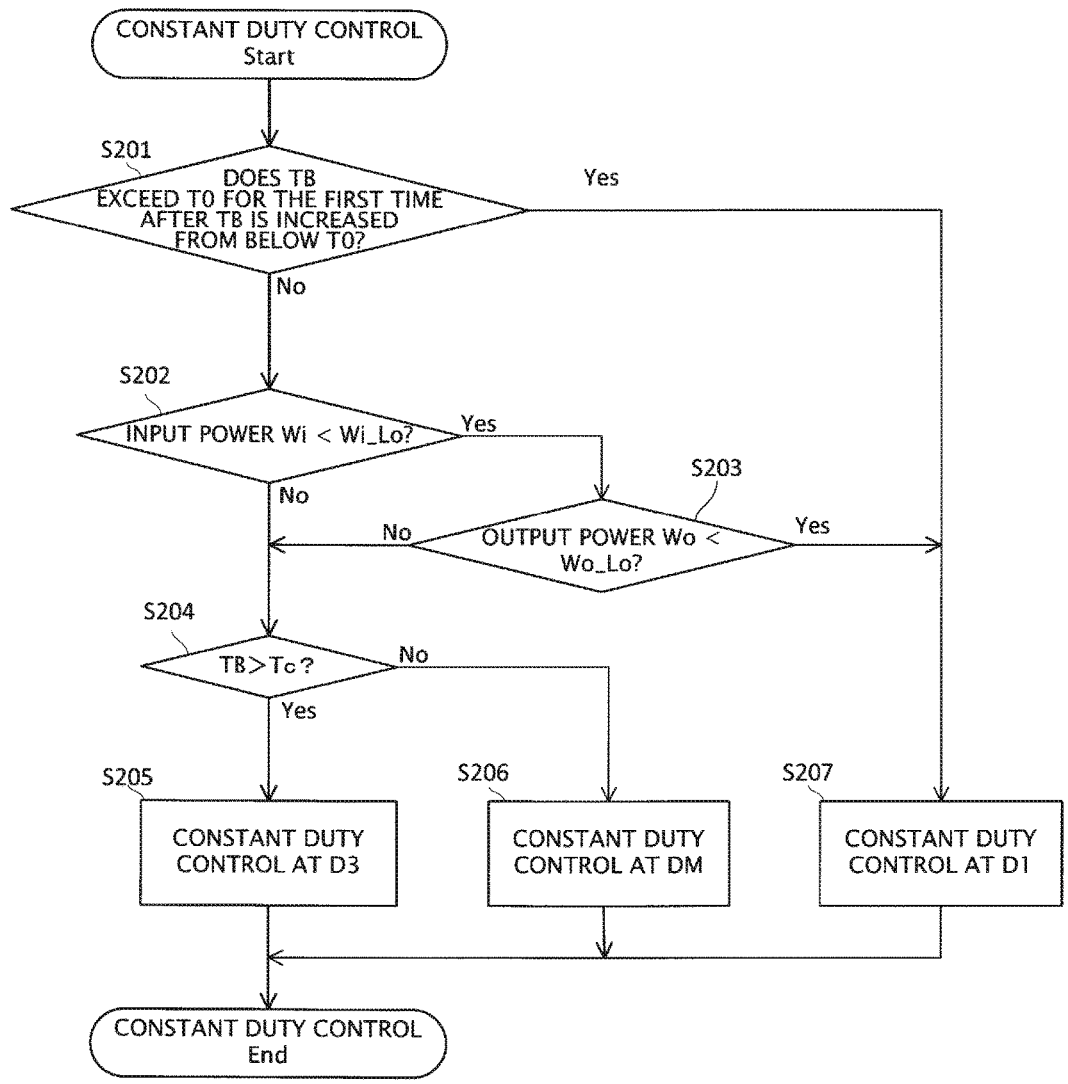
FIG. 6 is a flowchart illustrating a routine for constant duty control of the flowchart in FIG. 5.

Although, in one or more of the illustrated embodiments, the command duty D for the constant duty control is determined according to the flow illustrated in FIG. 6, the determination flow is given as an example and may be changed as appropriate. For example, although whether or not the battery temperature TB exceeds the reference temperature Tc is determined (step S204) as the final determination in the flow illustrated in FIG. 6, this determination may be performed first. In other words, when the battery temperature TB exceeds the reference temperature Tc, the constant duty control may be performed using the maximum value D3 regardless of whether or not other conditions are satisfied.

Although, in one or more of the above-described embodiments, a period starting from "Ready-ON" to "Ready-OFF" is referred to as a "trip," it may be the case that only some of such periods that satisfy specific conditions are counted as "trips." For example, only periods starting from "Ready-ON" to "Ready-OFF" that satisfy at least one of specific conditions may be counted as "trips," such as the condition that the period is 10 minutes or longer, the condition that continuous idling is performed for 30 seconds or longer in the period, and the condition that the vehicle runs at 40 km per hour or faster for some time during the period.

The present invention is not limited to the embodiments described above but encompasses any variations and modifications within the scope or spirit of the present invention as defined in the appended claims.

The invention claimed is:

1. A cooling system for cooling a vehicle-driving secondary battery mounted in an electrically powered vehicle, the cooling system comprising:
   a cooling fan configured to supply cooling air to the secondary battery; and
   a temperature sensor configured to detect a battery temperature representing a temperature of the secondary battery,
   the cooling system being configured to perform constant control in which the cooling fan is driven at a constant command value for a predetermined period of time when the battery temperature reaches or exceeds a predefined first temperature but does not reach a second temperature which is higher than the first temperature after startup of the electrically powered vehicle, and configured to perform a malfunction detection process for detecting whether or not a malfunction occurs in the cooling fan, based on an actual rpm of the cooling fan obtained during the constant control,
   wherein the cooling system performs the constant control and the malfunction detection process in a situation in which charging of the secondary battery is continued for a predetermined period of time or longer after the startup of the electrically powered vehicle, regardless of whether the battery temperature is below the first temperature, and stops the cooling fan in a situation in which the battery temperature is below the first temperature and the charging of the secondary battery is not continued for the predetermined period of time,
   wherein when the battery temperature reaches above the second temperature, the cooling system inhibits fixing the constant command value at any fixed command value and drives the cooling fan at a variable command value.

2. The cooling system for a vehicle-mounted secondary battery according to claim 1, wherein the situation in which the charging is continued for a predetermined period of time or longer includes a situation in which an SOC recovery switch through which a user provides an instruction for increasing an SOC of the secondary battery is turned ON.

3. The cooling system for a vehicle-mounted secondary battery according to claim 1, wherein the situation in which the charging is continued for a predetermined period of time or longer includes a situation in which the vehicle is charged from an external power supply.

4. The cooling system for a vehicle-mounted secondary battery according to claim 1, wherein the situation in which the charging is continued for a predetermined period of time or longer includes a situation in which an SOC of the secondary battery is below a predetermined lower threshold.

5. The cooling system for a vehicle-mounted secondary battery according to claim 1, wherein the cooling fan is driven under variable control using a command value that varies in accordance with at least the battery temperature when the constant control is not to be performed, and when the secondary battery is to be cooled.

* * * * *